UNITED STATES PATENT OFFICE.

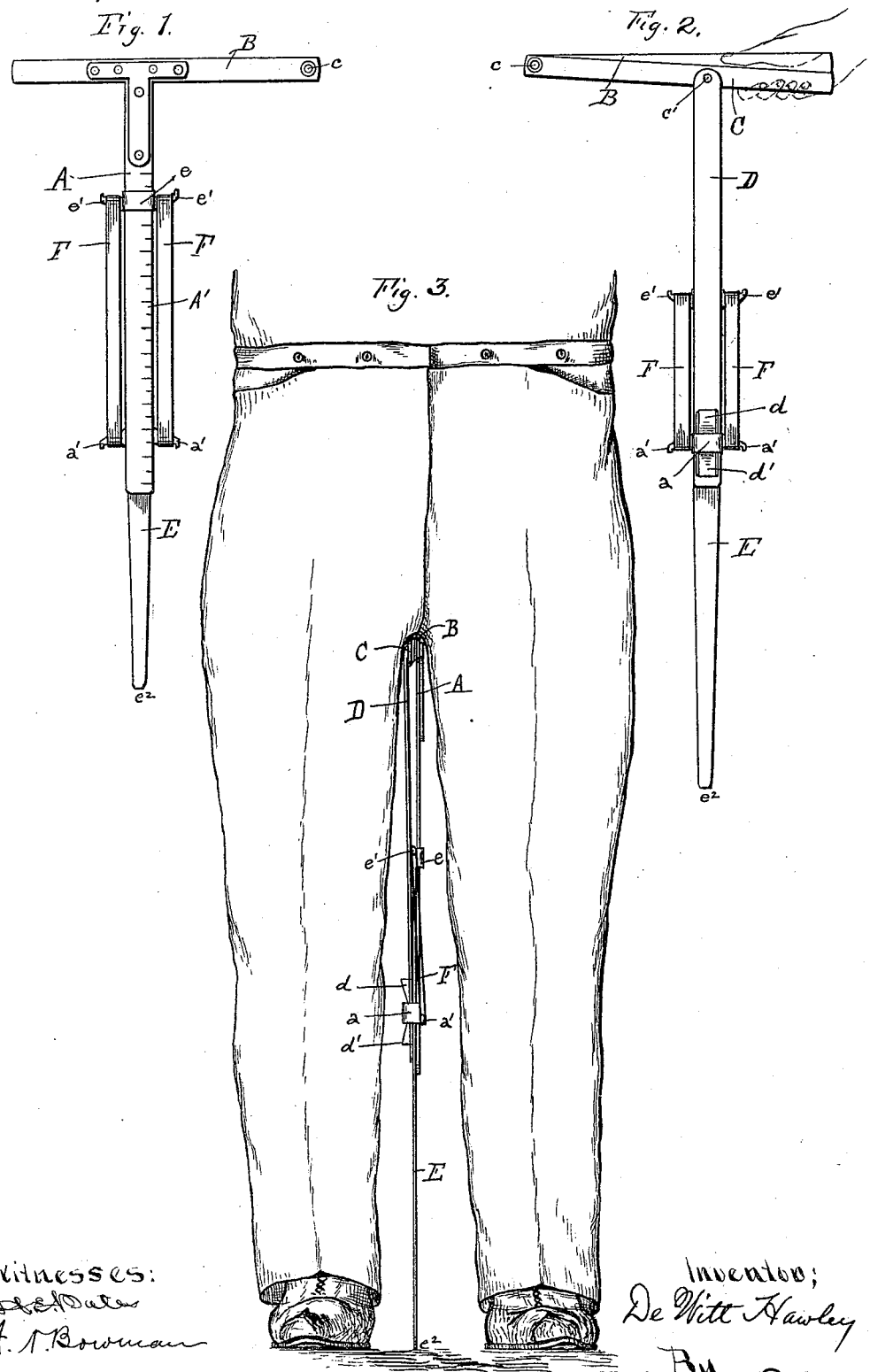

DE WITT HAWLEY, OF ROCHESTER, NEW YORK.

TAILOR'S MEASURING IMPLEMENT.

SPECIFICATION forming part of Letters Patent No. 518,947, dated May 1, 1894.

Application filed June 17, 1893. Serial No. 478,017. (No model.)

*To all whom it may concern:*

Be it known that I, DE WITT HAWLEY, a citizen of the United States, and a resident of the city of Rochester, in the county of Monroe and State of New York, have invented a new and useful Device for a Tailor's Measuring Implement, of which the following is a specification, reference being had to the accompanying drawings, in which—

Figure 1, is a front elevation of my device. Fig. 2, is a rear elevation thereof, and Fig. 3, is a side view thereof in position for use.

The object of my invention is to provide a simple, cheap and efficient measuring implement which is easy to use and the same consists in the devices and arrangements hereinafter set forth and claimed.

In the drawings, A, is a bar of suitable material, but preferably of some tough wood, upon one end of which is fastened a cross-handle B; to one end of the cross-handle is fastened as by the pivot $c$ a lever C conveniently of the same length and size as the cross-handle B. The lever C is pivoted at $c'$ to another bar D. The bar D is substantially of the same length as the bar A and is parallel therewith.

Upon the bar A is marked a scale A'. Upon the bar D is fastened a wedge $d$ which may be single or double, but is preferably double, as shown at $d\ d'$; the apices of the two wedges are next each other. To the lower end of the bar A is fastened a guide $a$ which extends around the bar D the extension bar E and in such position that the wedge or wedges $d\ d'$ lie under the same. The guide is so close to the bar D that the wedges may cramp under it.

Between the bars A and D is placed an extension bar E which lies between them and within the guide $a$. The upper end of the extension bar E has a guide $e$ which is fastened to the same and extends around the bar A acting both as a guide for that end of the extension bar E and as the indicator for the scale A'. The extension bar E being guided by the guides $e$ and $a$, may slide in and out between the bars A and D, but in line therewith. The guide $a$ is stationary when the bar E is moved in and out, but the guide $e$ slides up and down as the end of the extension bar E is moved.

On each side of the guide $e$ is a lug $e'$ and on each side of the bar is a lug $a'$, to these lugs are fastened contractible springs F F which may conveniently be india-rubber bands as these are easy to procure and replace in case of breakage. The springs may, however, be made of coiled wire. The contraction of these springs F F tends to extend the extension bar E longitudinally with reference to the bar A and thereby to increase the total length of the implement from the cross-handle B to the lower end $e^2$ of the extension bar E. Movement of the lever C transmits movement through the bar D to the wedge or wedges $d\ d'$; on loosening the wedge by movement of the lever C the extension bar E may be pushed between the bars A and D, so as to shorten the total length of the implement and stretch the springs F F, in which case the parts take the positions shown in Fig. 1. In this position the lever C may be moved so as to wedge or clamp the parts together; if now, the lever C is moved into the position shown in Fig. 2, so as to release the wedges and permit the springs F F to contract, the extension bar E will be extended and will continue to extend within the limits imposed by the length of the different parts of the implement, until the lever C is moved to operate the wedge or wedges $d\ d'$, and again clamp the parts together. In this way the extension bar E may be allowed to extend and to elongate the whole implement until it is desired to stop the elongation at any point.

The scale A' is so adjusted as by means of the guide $e$ always to show the total length of the implement from the upper side of the cross-handle B to the lower end $e^2$ of the bar E.

In use the cross-handle B and lever C are grasped by the hand, as shown in Fig. 2, so that the thumb rests on the upper side of the free end of the lever C, and the fingers pass around the lower side of the lever. The implement is then placed in position as shown in Fig. 3. Pressure of the thumb on the upper side of the lever C moves said lever and with it the bar D and thus unclamps the wedge or wedges $d\ d'$. The springs cause the extension bar E to move automatically until the lower end $e^2$ touches the floor; then the contraction of the fingers causes the lever C to move the wedge or wedges $d$ $d'$ back to clamp bars A, D and E, together. The instrument may then be moved from the position shown in Fig. 3 and the measurement may be made accurately from the scale $a$. The main bar A and the extension bar E may be tubular so that one slides within the other and the wedge or wedges may be circular instead of straight.

This device is cheap, light, readily portable, it is easily and quickly placed in position, the extension is easily and quickly controlled and the operator may stand comfortably while using it.

What I claim is—

1. In a tailor's measuring implement, the combination of a stationary bar having a cross-handle on one end, an extensible bar, a contractible spring connecting the two bars and adapted to extend the same longitudinally with reference to each other, a clamping device for locking the two bars together and a lever pivoted to said cross-handle and connected to said clamping device for operating the same, substantially as described.

2. In a tailor's measuring implement, a stationary bar provided with a cross-handle on one end, an extension bar, guides for limiting the movement of said two bars longitudinally with reference to each other, a contractible spring or springs connecting said two bars and adapted to extend the same longitudinally with reference to each other, a clamping device for locking the two bars together, a lever pivoted to the cross-handle and a connecting rod pivoted to said lever and connected to said clamping device, substantially as described.

3. In a tailor's measuring implement, a stationary bar provided with a cross-handle on one end, an extension bar, a guide fixed to said stationary bar and extending around said extension bar, a guide fixed to said extension bar and extending around said stationary bar, a contractible spring or springs connected to said guides and adapted to extend said two bars longitudinally with reference to each other, a clamping device for locking the two bars together, a lever pivoted to said cross-handle and a connecting rod pivoted to said lever and connected to said clamping device, substantially as described.

4. In a tailor's measuring implement, the combination of a stationary bar provided with a cross-handle on one end, an extension bar, a contractible spring or springs connecting said two bars and adapted to extend the same longitudinally with reference to each other, a guide fixed to said extension bar and extending around said stationary bar, a guide fixed to said stationary bar and extending around said extension bar, a clamping device as the wedge or wedges $d$ $d'$ operating under one of said guides and adapted to wedge said two bars together by pressure against said guide, a lever pivoted to said cross-handle and connections with said clamping device for operating the same, substantially as described.

5. In a tailor's measuring implement, the combination of a stationary bar provided with a cross-handle on one end, an extension bar, a guide connected to said stationary bar and passing around said extension bar and a guide connected to said extension bar and passing around said stationary bar, lugs upon said guides and springs connected to said lugs, whereby to extend said bars longitudinally with reference to each other, and a clamping device for fastening said two bars together, substantially as described.

DE WITT HAWLEY.

Witnesses:
A. N. BOWMAN,
S. P. MOORE.